(12) United States Patent
Douglas (10) Patent No.: US 10,342,271 B1
(45) Date of Patent: Jul. 9, 2019

(54) CAR SEAT JACKET

(71) Applicant: Adriane Douglas, Portland, OR (US)

(72) Inventor: Adriane Douglas, Portland, OR (US)

(73) Assignee: Adriane Douglas, Portland, OR (US)

( * ) Notice: Subject to any disclaimer, the term of this patent is extended or adjusted under 35 U.S.C. 154(b) by 397 days.

(21) Appl. No.: 14/664,337

(22) Filed: Mar. 20, 2015

Related U.S. Application Data (60) Provisional application No. 61/970,960, filed on Mar. 27, 2014.

(51) Int. Cl.
| | | |
|---|---|---|
| *A41D 11/00* | (2006.01) | |
| *A41D 1/02* | (2006.01) | |
| *B60N 2/26* | (2006.01) | |

(52) U.S. Cl.
CPC .............. *A41D 11/00* (2013.01); *A41D 1/02* (2013.01); *B60N 2/26* (2013.01)

(58) Field of Classification Search
CPC .......... A41D 11/00; A41D 1/02; A41D 27/10; B60N 2/26; B60N 2/265
USPC ............................................ 2/93, 2.5, 94, 69
See application file for complete search history.

(56) References Cited

U.S. PATENT DOCUMENTS

| | | | | | |
|---|---|---|---|---|---|
| 870,004 | A | * | 11/1907 | Winks | A41D 3/02 2/85 |
| 1,369,761 | A | * | 2/1921 | Berry | A41D 11/00 2/71 |
| 2,145,726 | A | * | 1/1939 | Kupperblatt | A41D 15/00 2/93 |
| 2,256,597 | A | * | 9/1941 | Quilter | B65D 10/00 244/143 |
| 2,291,861 | A | * | 8/1942 | Astrove | A41B 13/005 2/80 |
| 2,382,816 | A | * | 8/1945 | Quilter | B64D 10/00 244/143 |
| 2,657,159 | A | * | 10/1953 | Nahman | A41H 3/06 156/93 |
| 3,074,074 | A | * | 1/1963 | Lovering | A01M 31/00 182/3 |
| 4,177,877 | A | * | 12/1979 | Gallinati | A41D 13/0007 182/3 |
| 4,513,451 | A | * | 4/1985 | Brown | A41D 27/285 2/102 |
| 4,722,099 | A | * | 2/1988 | Kratz | A41D 27/28 2/115 |
| 4,731,883 | A | * | 3/1988 | Foster | A41D 27/28 2/247 |
| 5,090,058 | A | * | 2/1992 | Gerber | A41D 27/10 2/97 |

(Continued)

OTHER PUBLICATIONS http://www.worthpoint.com/worthopedia/coach-soho-multi-print-small-flap-74966788. Coach Soho Multi Print Small Flap #11907. Jul. 7, 2009.*

*Primary Examiner* — Shaun R Hurley
*Assistant Examiner* — Bao-Thieu L Nguyen
(74) *Attorney, Agent, or Firm* — Moss & Barnett; Michael A. Bondi (57) ABSTRACT

A car seat jacket including a jacket body and a closure mechanism. The jacket body has a neck opening and at least one slot proximate the neck opening. The closure mechanism is operably attached to the jacket body. The closure mechanism is positionable in a closed configuration. When the closure mechanism is in the closed configuration, the closure mechanism substantially covers the at least one slot.

8 Claims, 4 Drawing Sheets

(56) References Cited

U.S. PATENT DOCUMENTS

| | | | | |
|---|---|---|---|---|
| 5,127,106 A * | 7/1992 | Aldridge | A62B 17/001 | 2/79 |
| 5,297,295 A * | 3/1994 | Barbeau | A41D 13/0002 | 2/141.1 |
| 5,621,917 A * | 4/1997 | Howsden | A41B 13/06 | 2/111 |
| 5,635,909 A * | 6/1997 | Cole | A62B 17/003 | 2/93 |
| 5,704,064 A * | 1/1998 | van der Sleesen | A41D 27/28 | 2/108 |
| 5,718,000 A * | 2/1998 | Ost | A41D 3/00 | 2/102 |
| 5,943,698 A * | 8/1999 | Blanks, I | A41D 27/08 | 2/115 |
| 5,991,924 A * | 11/1999 | Grilliot | A62B 17/001 | 2/100 |
| 6,085,353 A * | 7/2000 | van der Sleesen | A41D 15/04 | 2/108 |
| 6,101,631 A * | 8/2000 | Ferguson, Jr. | A41D 13/0007 | 182/3 |
| 6,182,291 B1 * | 2/2001 | Garvey | A41D 13/0012 | 2/102 |
| 6,421,833 B2 * | 7/2002 | Khanamirian | B63C 11/02 | 182/3 |
| 6,442,760 B2 * | 9/2002 | Moretti | A41D 27/28 | 2/115 |
| 6,449,770 B1 * | 9/2002 | Taylor | A41D 13/0007 | 128/869 |
| 6,487,725 B1 * | 12/2002 | Jordan | A41D 13/0007 | 182/3 |
| 6,934,970 B1 * | 8/2005 | Watkins | A41D 13/0512 | 2/96 |
| 7,003,812 B1 * | 2/2006 | Lewis | A41D 27/18 | 2/468 |
| D530,885 S * | 10/2006 | Barthel | D2/720 | |
| 7,131,703 B1 * | 11/2006 | Sheridan | B60R 22/105 | 297/465 |
| 7,171,695 B2 * | 2/2007 | Braun | A41D 27/28 | 2/247 |
| 7,356,850 B2 * | 4/2008 | Turcotte | A41D 13/0007 | 182/3 |
| 7,464,413 B2 * | 12/2008 | Todd | A41D 27/20 | 2/94 |
| 7,607,184 B1 * | 10/2009 | Goodner, Jr. | A61G 1/013 | 2/69.5 |
| 7,665,153 B2 * | 2/2010 | Grilliot | A41D 13/0007 | 182/3 |
| 7,707,660 B2 * | 5/2010 | Grilliot | A41D 13/0007 | 182/3 |
| 7,818,818 B2 * | 10/2010 | Grilliot | A41D 13/0007 | 2/329 |
| 7,954,173 B2 * | 6/2011 | Collier | A41D 1/06 | 2/108 |
| 7,971,273 B2 * | 7/2011 | Grilliot | A41D 13/0007 | 2/227 |
| 8,430,204 B1 * | 4/2013 | Reynolds | A41D 13/0007 | 182/3 |
| 8,904,565 B2 * | 12/2014 | Barrett Barber | A41D 1/02 | 2/69 |
| 2001/0010098 A1 * | 8/2001 | Polegato Moretti | A41D 27/28 | 2/97 |
| 2003/0126668 A1 * | 7/2003 | Scroggins | A41D 13/1236 | 2/114 |
| 2005/0017566 A1 * | 1/2005 | Rizk | A41D 11/00 | 297/465 |
| 2007/0044197 A1 * | 3/2007 | Turcotte | A41D 13/0007 | 2/69 |
| 2008/0164095 A1 * | 7/2008 | Snedeker | A41D 13/0007 | 182/3 |
| 2008/0256679 A1 * | 10/2008 | White | A41D 1/20 | 2/84 |
| 2008/0289089 A1 * | 11/2008 | Grilliot | A41D 13/0007 | 2/458 |
| 2009/0293171 A1 * | 12/2009 | Fayle | A41D 27/10 | 2/85 |
| 2010/0031415 A1 * | 2/2010 | Shadid | A41D 13/0012 | 2/87 |
| 2010/0299798 A1 * | 12/2010 | Fayle | A41D 27/10 | 2/69 |
| 2015/0020288 A1 * | 1/2015 | Picot | A41D 13/129 | 2/69 |
| 2015/0181953 A1 * | 7/2015 | Brown | A41D 11/00 | 2/69 |
| 2015/0250238 A1 * | 9/2015 | Garcia | A41D 15/00 | 705/26.5 |

* cited by examiner

CAR SEAT JACKET

REFERENCE TO RELATED APPLICATION

This application claims priority to U.S. Provisional Application No. 61/970,960, which was filed on Mar. 27, 2014, the contents of which are incorporated herein by reference.

FIELD OF THE INVENTION

The invention relates generally to clothing. More particularly, the invention relates to a jacket that is adapted for use by a child using a car seat.

BACKGROUND OF THE INVENTION

It is customary for children to be positioned in a car seat when traveling in a vehicle such as a car or a van when such children are too small to be properly restrained by seat belts in the vehicle that are designed for use by adults.

Similar to a conventional seat that is in the vehicle, the car seat may include a lower portion on which the child sits and an upper portion that is positioned behind the child's back. The lower portion and the upper portion may each be formed with a size that corresponds to the size of the child that is intended to use the car seat.

The car seat may also include a belt system that maintains the child in a relatively stationary position in the car seat. In one such configuration, the belt system includes five points at which the belt attaches to the car seat.

In one common configuration, two attachment points are located adjacent to the child's hips, one attachment point is located between the child's legs and two attachment points are located behind the child's shoulders.

For the belt system to retain the child in the relatively stationary position in the car seat, the belt system must be relatively tight. When the belt system is adjusted for wearing by a child wearing relatively this clothing such as a shirt, the belt system may be too tight when the child is wearing a jacket. Alternatively, when the belt system is adjusted for use by a child who is wearing a jacket, the belt system may be too loose when the child is not wearing the jacket.

Heretofore, there has not been a system that enables the car seat to be used by a child that is or is not wearing a jacket that enables the belt system to be sufficiently tight so that the car seat provides an adequate level of protection to the child in the event the vehicle encounters an accident.

SUMMARY OF THE INVENTION

An embodiment of the invention is directed to a car seat jacket having a jacket body and a closure mechanism. The jacket body has a neck opening and at least one slot proximate the neck opening. The closure mechanism is operably attached to the jacket body. The closure mechanism is positionable in a closed configuration. When the closure mechanism is in the closed configuration, the closure mechanism substantially covers the at least one slot.

Another embodiment of the invention is directed to a method of facilitating securing a child in a car seat. A jacket body having a neck opening is provided. At least one slot is formed in the jacket body proximate the neck opening. The at least one slot is capable of receiving a strap that is attached to the car seat. A closure mechanism is operably attached to the jacket body. The closure mechanism is positioned in a closed configuration to substantially cover the at least one slot.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

An embodiment of the invention is directed to a car seat jacket as illustrated at 100 in the figures. The car seat jacket 100 is particularly adapted for use by a child that is restrained in a car seat having a restraint system such as a five point belt system.

While the figures illustrate the use of the invention in conjunction with a jacket having long sleeves, the invention is also suited for use in conjunction with other types of clothing that are intended to be worn on an upper portion of the child's body. Examples of such other types of clothing include vests and snowsuits that not only cover the upper portion of the child's body but also the lower portion of the child's body. When the invention is used in conjunction with clothing that also covers the lower portion of the child's body, additional apertures may be formed therein.

The car seat jacket 100 may generally include a back panel 110, a first front panel 112 and a second front panel 114, such as illustrated in FIGS. 1-5. The first front panel 112 and the second front panel 114 are both secured to the back panel 110.

A person of skill in the art would also appreciate that the car seat jacket 100 having alternative configurations is within the scope of the invention. For example, while it is illustrated that the car seat jacket 100 includes a first front panel 112 that is separate from the second front panel 114, it is possible for the first front panel 112 to be attached to the second front panel 114 such as would be used in a pullover jacket.

The attachment of the first front panel 112 and the second front panel 114 to the back panel 110 may define two arm holes 116 that are positioned proximate an upper edge thereof. The arm holes 116 are adapted to receive the child's arms. In certain embodiments, a sleeve 118 may be attached to the car seat jacket 100 proximate the arm holes 116.

The first front panel 112 and the second front panel 114 may be secured to each other by a fastening mechanism 120. An example of fastening mechanisms 120 that is suitable for use in conjunction with the invention include hook and loop fastener, zipper, buttons and snaps.

In certain embodiments, the hook and loop fastener is available under the designation VELCRO®. On particularly beneficial configuration is VELCRO® model PN90200, which provides good fastening ability while minimizing snagging of a wearer's hair.

When the first front panel 112 and the second front panel 114 are positioned in the closed configuration with the fastening mechanism 120, the car seat jacket 100 has a neck opening 122 proximate an upper end thereof. The neck opening 122 is adapted to receive the child's neck.

The back panel 110, the first front panel 112 and the second front panel 114 may be fabricated from a variety of materials using the concepts of the invention depending on the ambient temperatures at which the car seat jacket 100 is intended to be used. For example, the material may have a relatively high insulating value when the ambient temperature is relatively low.

Proximate an intersection of the back panel 110 and the first front panel 112 and the second front panel 114 on at least one side of the neck opening 122, a slot 130 is formed therein. In certain embodiments the slot 130 is formed on both sides of the neck opening 122 such that the car seat jacket 100 can be used with a car seat having a five point harness.

While it is illustrated that the slot 130 substantially extends between the neck opening 122 and the arm holes 116. The length of the slot 130 can be selected based upon a variety of factors. For example, the slot 130 may be formed with a length that is greater than the width of the straps used on the car seat such that contact between the strap and the edges of the slot 130 causes the car seat jacket 100 to stretch or be crumbled. In certain embodiments, the length of the slot 130 may be up to about 2 inches.

The slots 130 may be oriented in a direction that generally conforms to the direction of the car seat strap. In one such configuration, the slots 130 may each be oriented generally horizontal.

Since the car seat strap is typically relatively thin, the slot 130 may be formed with a relatively small width. In certain embodiments, the width of the slot 130 is less than about ½ of an inch. Forming the slot 130 with a relatively small width also minimizes the potential of air flowing through the slot, which could cause the child wearing the car seat jacket 100 to feel cold. To facilitate placing the car seat strap into the slot 130, the slot 130 may intersect the neck opening 122.

A closure mechanism may be provided to at least partially cover the slot 130. The closure mechanism may be configured to allow easy separation to facilitate moving the car seat strap into and out of the slot 130.

The closure mechanism may be particularly beneficial when the car seat jacket 100 is being worn by the child when the child is not in the car seat because the closure mechanism prevents cool air from readily passing into contact with the child's skin.

In certain embodiments, the closure mechanism includes a first flap 140 and a second flap 142. While it is illustrated that the first flap 140 and the second flap 142 have a similar shape and size, it is possible for the first flap 140 and the second flap 142 to have different shapes and/or sizes.

The first/second flap 140, 142 are secured to the car seat jacket 100 proximate a first edge 144 thereof. The attachment along the first edge 144 may be permanent such as using stitching so that the first/second flap 140, 142 resists separation from the car seat jacket 100.

A detachable fastening device 146 may be provided on the first/second flap 140, 142 proximate a second edge 148 of the first/second flap 140, 142 that is generally opposite the first edge 144. The detachable fastening device 146 is capable of engaging a complementary detachable fastening device 149 that is provided on the car seat jacket 100. The detachable fastening device 146, 149 may have a variety of configurations. Examples of a few suitable configurations include a hook and loop fastener (VELCRO®), magnets or snaps.

Figures 1, 2, 3, 4:
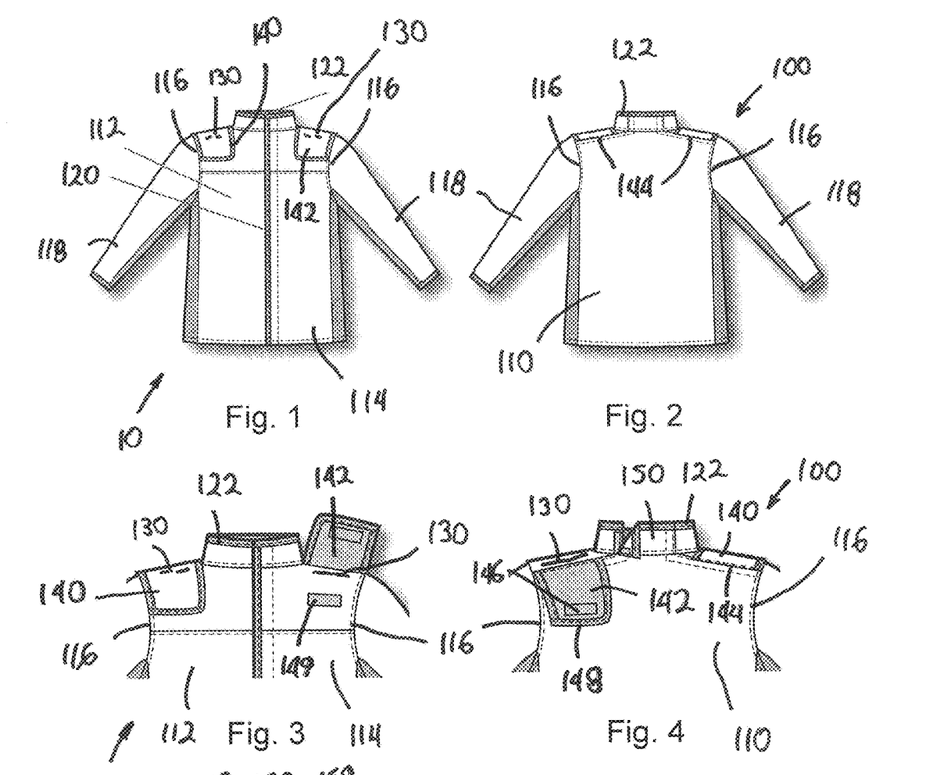
FIG. 1 is a front view of a car seat jacket according to an embodiment of the invention where a first flap, a second flap and a third flap are each in a closed configuration.
FIG. 2 is a back view of the car seat jacket of FIG. 1 where the first flap, the second flap and the third flap are each in the close configuration.
FIG. 3 is a front view of the car seat jacket of FIG. 1 where the first flap is in an open configuration.
FIG. 4 a back view of the car seat jacket of FIG. 1 where the first flap is in the open configuration.
Figure 5:
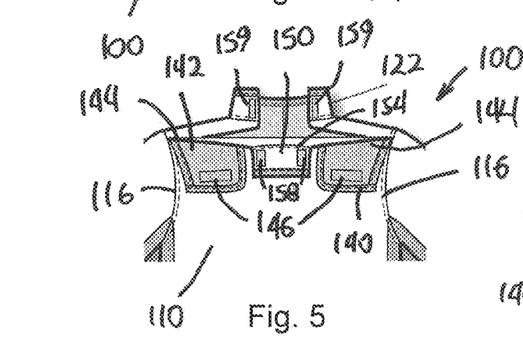
FIG. 5 is a back view of the car seat jacket of FIG. 1 where the first flap, the second flap and the third flap are each in the open configuration.

The configuration of the first/second flap 140, 142 enables the first/second flap 140, 142 to be moved between a closed configuration (FIGS. 1 and 2) and an open configuration (FIGS. 3-5).

The first/second flap 140, 142 is positioned in the closed configuration when the car seat jacket 100 is used when not in the car seat. The first/second flap 140, 142 thereby increases the warmth provided by the car seat jacket 100.

The first/second flap 140, 142 is positioned in the open configuration when the car seat jacket 100 is used in conjunction with a car seat so that the car seat straps can pass through the slots 130 while the car seat jacket 100 is worn. This process thereby enables the child wearing the car seat jacket 100 to be more securely fastened into the car seat than is possible by positioning the car seat straps over the jacket.

Figure 6:
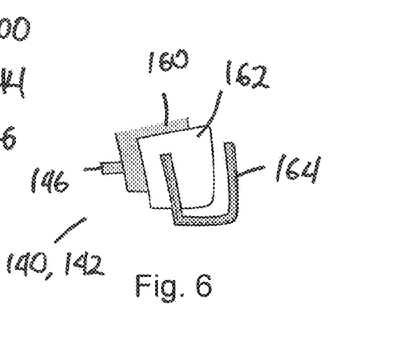
FIG. 6 is an exploded view of the first flap.
Figure 7:
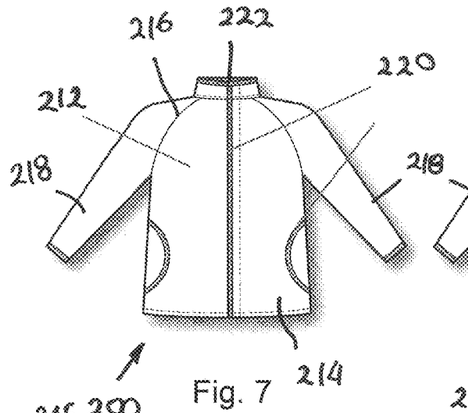
FIG. 7 is a front view of an alternative embodiment of the car seat jacket where a first flap and a second flap are each in a closed configuration.
Figure 8:
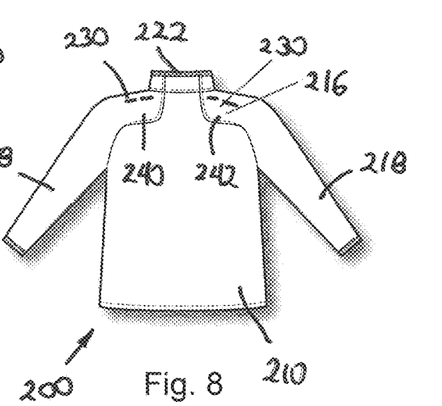
FIG. 8 is a back view of the car seat jacket of FIG. 7 where the first flap and the second flap are each in the closed configuration.
Figure 9:
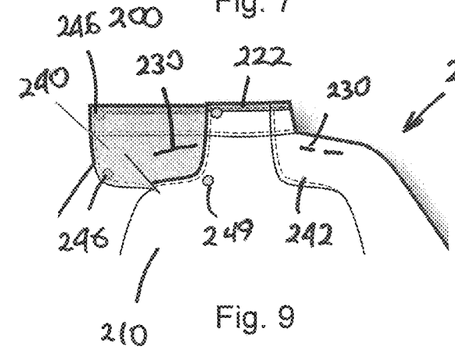
FIG. 9 is a back view of the car seat jacket of FIG. 7 where the first flap is in a fully open configuration.

The first/second flap 140, 142 may be fabricated with a multiple layer configuration, as illustrated in FIG. 6, to increase the warmth provided by the first/second flap 140, 142. This multiple layer configuration may include at least an inner layer 160 and an outer layer 162.

The outer layer 162 may have a color that contrasts from the color of the other portions of an outer surface of the car seat jacket 100 to enhance the ability that a person can quickly identify the first/second flap 140, 142 when it is quickly needed to remove the child from the car seat. Alternatively or additionally, the first/second flap 140, 142 may have a border 164 that is formed from a contrasting color from the other portions of the car seat jacket 100. As illustrated in FIGS. 3 and 5, the border 164 around an edge of the first/second flap 140, 142 that is not attached to the car seat jacket 100.

The closure mechanism may also include a third flap 150 that is positioned intermediate the first flap 140 and the second flap 142. This third flap 150 may have a shape that is similar to other portions of the collar on the car seat jacket 100.

The third flap 150 is secured to the car seat jacket 100 proximate a first edge 154 thereof. The attachment along the first edge 154 may be permanent such as using stitching so that the third flap 150 resists separation from the car seat jacket 100.

A detachable fastening device 146 may be provided on the first/second flap 140, 142 proximate a second edge 148 of the first/second flap 140, 142 that is generally opposite the first edge 144. The detachable fastening device 146 is capable of engaging a complementary detachable fastening device 149 that is provided on the car seat jacket 100. The detachable fastening device 146, 149 may have a variety of configurations. Examples of a few suitable configurations include a hook and loop fastener (VELCRO®), magnets or snaps.

The configuration of the third flap 150 enables the third flap 150 to be moved between a closed configuration (FIGS. 1-3) and an open configuration (FIGS. 4 and 5).

The third flap 150 is positioned in the closed configuration when the car seat jacket 100 is used when not in the car seat. The third flap 150 thereby increases the warmth provided by the car seat jacket 100.

The third flap 150 is positioned in the open configuration when the car seat jacket 100 is used in conjunction with a car seat so that the car seat straps can pass through the slots 130 while the car seat jacket 100 is worn. This process thereby enables the child wearing the car seat jacket 100 to be more securely fastened into the car seat than is possible by positioning the car seat straps over the jacket.

The car seat jacket 100 may be configured differently for use by children having different sizes. For example, the car seat jacket 100 may have a different configuration for use by children weighing less than 30 pounds and children weighing more than 30 pounds.

In certain circumstances such as when the vehicle is in an accident, it may be desirable to quickly remove the child from the car seat. Positioning the car seat closure mechanism beneath the car seat jacket 100 may inhibit the ability to access the car seat strap closure mechanism.

In such situations, the front closure on the car seat jacket 100 may facilitate rapid opening. An example of one such closure mechanism that permits rapid opening is a hook and loop fastener (VELCRO®).

The car seat jacket may also include at least one weakened region in at least one of the first front panel 112 and the second front panel 114. Such a weakened region may give way in response to a relatively small force placed thereon so as to provide access to the car seat strap closure mechanism.

Figure 15:
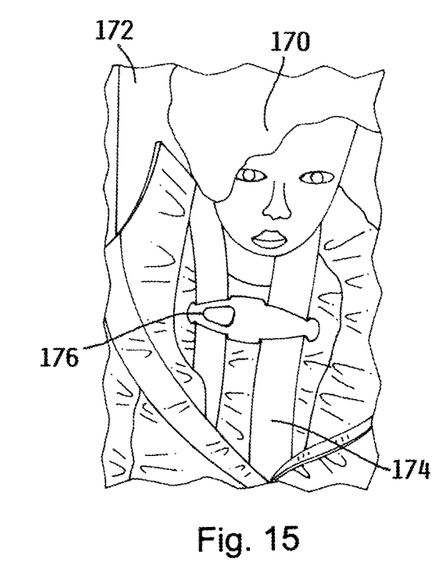
FIG. 15 is a front view of the child in the car seat with the car seat jacket in an open configuration.
Figure 16:
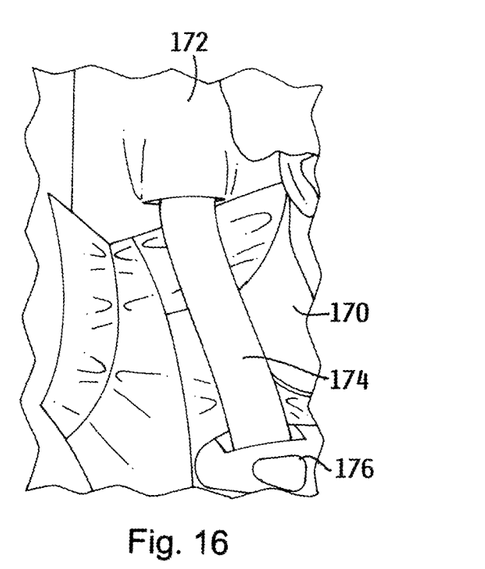
FIG. 16 is a close up front view of the child in the car seat with the car seat jacket in the open configuration.
Figure 17:
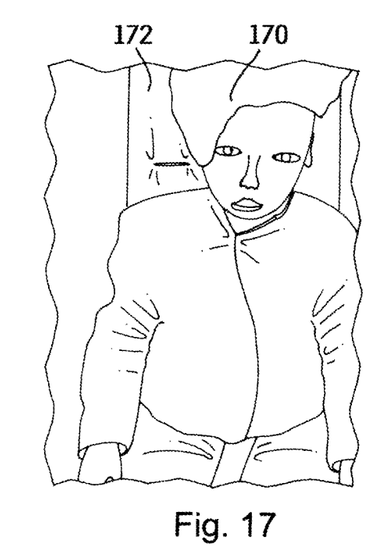
FIG. 17 is a front view of the child in the car seat with the car seat jacket in a closed configuration.
Figure 18:
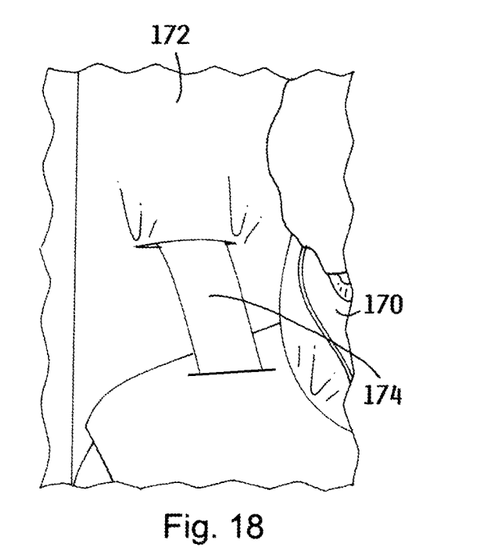
FIG. 18 is a close up front view of the child in the car seat with the car seat jacket in the closed configuration that shows the strap extending from the car seat jacket.

A child 170 is positioned in a car seat 172, as illustrated in FIGS. 15-18. The car seat jacket 100 is positioned in an open configuration as illustrated in FIGS. 15 and 16. The strap 174 is extended through the slot 130, placed over the child 102 and secured with the latch 176. The car seat jacket 172 is then moved to the closed configuration, as illustrated in FIGS. 17 and 18, where the strap 174 extends through the slot 130.

Another embodiment of the car seat jacket 200 may generally include a back panel 210, a first front panel 212 and a second front panel 214, such as illustrated in FIGS. 6-10. The first front panel 212 and the second front panel 214 are both secured to the back panel 210.

A person of skill in the art would also appreciate that the car seat jacket 200 having alternative configurations is within the scope of the invention. For example, while it is illustrated that the car seat jacket 200 includes a first front panel 212 that is separate from the second front panel 214, it is possible for the first front panel 212 to be attached to the second front panel 214 such as would be used in a pullover jacket.

The attachment of the first front panel 212 and the second front panel 214 to the back panel 210 may define two arm holes 216 that are positioned proximate an upper edge thereof. The arm holes 216 are adapted to receive the child's arms. In certain embodiments, a sleeve 218 may be attached to the car seat jacket 200 proximate the arm holes 216.

The first front panel 212 and the second front panel 214 may be secured to each other by a fastening mechanism 220. An example of fastening mechanisms 220 that is suitable for use in conjunction with the invention include hook and loop fastener, zipper, buttons and snaps.

In certain embodiments, the hook and loop fastener is available under the designation VELCRO®. On particularly beneficial configuration is VELCRO® model PN90200, which provides good fastening ability while minimizing snagging of a wearer's hair.

When the first front panel 212 and the second front panel 214 are positioned in the closed configuration with the fastening mechanism 220, the car seat jacket 200 has a neck opening 222 proximate an upper end thereof. The neck opening 222 is adapted to receive the child's neck.

The back panel 210, the first front panel 212 and the second front panel 214 may be fabricated from a variety of materials using the concepts of the invention depending on the ambient temperatures at which the car seat jacket 200 is intended to be used. For example, the material may have a relatively high insulating value when the ambient temperature is relatively low.

Proximate an intersection of the back panel 210 and the first front panel 212 and the second front panel 214 on at least one side of the neck opening 222, a slot 230 is formed therein. In certain embodiments the slot 230 is formed on both sides of the neck opening 222 such that the car seat jacket 200 can be used with a car seat having a five point harness.

The length of the slot 230 can be selected based upon a variety of factors. For example, the slot 230 may be formed with a length that is greater than the width of the straps used on the car seat such that contact between the strap and the edges of the slot 230 causes the car seat jacket 200 to stretch or be crumbled. In certain embodiments, the length of the slot 230 may be up to about 2 inches.

The slots 230 may be oriented in a direction that generally conforms to the direction of the car seat strap. In one such configuration, the slots 230 may each be oriented generally horizontal.

Since the car seat strap is typically relatively thin, the slot 230 may be formed with a relatively small width. In certain embodiments, the width of the slot 230 is less than about ½ of an inch. Forming the slot 230 with a relatively small width also minimizes the potential of air flowing through the slot, which could cause the child wearing the car seat jacket 200 to feel cold.

A closure mechanism may be provided to at least partially cover the slot 230. The closure mechanism may be configured to allow easy separation to facilitate moving the car seat strap into and out of the slot 230.

The closure mechanism may be particularly beneficial when the car seat jacket 200 is being worn by the child when the child is not in the car seat because the closure mechanism prevents cool air from readily passing into contact with the child's skin.

In certain embodiments, the closure mechanism includes a first flap 240 and a second flap 242. While it is illustrated that the first flap 240 and the second flap 242 have a similar shape and size, it is possible for the first flap 240 and the second flap 242 to have different shapes and/or sizes.

The first/second flap 240, 242 may be defined by an upper portion of the arm of the car seat jacket 200 and, as such, the first/second flap 240, 242 are secured to the car seat jacket 200 along at least one edge thereof. Alternatively, the first/second flap 240, 242 may be separate from the other portions of the car seat jacket 200 and attached during the manufacturing process.

A detachable fastening device 246 may be provided on the first/second flap 240, 242 proximate a second edge of the first/second flap 240, 242 that is not attached to the car seat jacket 200. The detachable fastening device 246 is capable of engaging a complementary detachable fastening device 249 that is provided on the car seat jacket 200. The detachable fastening device 246, 249 may have a variety of configurations. Examples of a few suitable configurations include a hook and loop fastener (VELCRO®), magnets or snaps.

Figure 10:
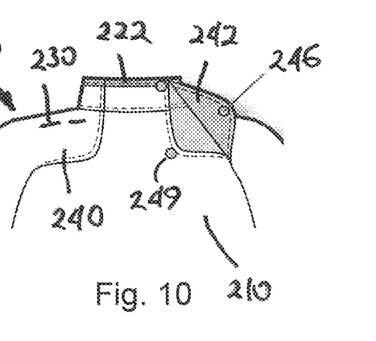
FIG. 10 is a back view of the car seat jacket of FIG. 7 where the second flap is in a partially open configuration.

The configuration of the first/second flap 240, 242 enables the first/second flap 240, 242 to be moved between a closed configuration (FIGS. 7-9) and an open configuration (FIG. 10).

The first/second flap 240, 242 is positioned in the closed configuration when the car seat jacket 200 is used when not in the car seat. The first/second flap 240, 242 thereby increases the warmth provided by the car seat jacket 200.

The first/second flap 240, 242 is positioned in the open configuration when the car seat jacket 200 is used in conjunction with a car seat so that the car seat straps can pass through the slots 230 while the car seat jacket 200 is worn. This process thereby enables the child wearing the car seat jacket 200 to be more securely fastened into the car seat than is possible by positioning the car seat straps over the jacket.

Figure 11:
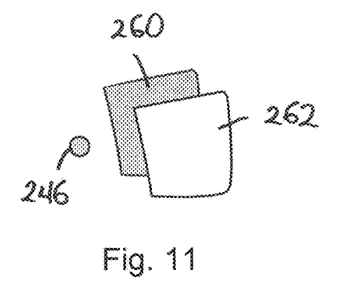
FIG. 11 is an exploded view of the first flap.

The first/second flap 240, 242 may be fabricated with a multiple layer configuration, as illustrated in FIG. 11, to increase the warmth provided by the first/second flap 240, 242. This multiple layer configuration may include at least an inner layer 260 and an outer layer 262.

The outer layer 262 may have a color that contrasts from the color of the other portions of the car seat jacket 200 to enhance the ability that a person can quickly identify the first/second flap 240, 242 when it is quickly needed to remove the child from the car seat. Alternatively or additionally, the first/second flap 240, 242 may have a border (not shown) that is formed from a contrasting color from the other portions of the car seat jacket 200.

The car seat jacket 200 may be configured differently for use by children having different sizes. For example, the car seat jacket 200 may have a different configuration for use by children weighing less than 30 pounds and children weighing more than 30 pounds.

In certain circumstances such as when the vehicle is in an accident, it may be desirable to quickly remove the child from the car seat. Positioning the car seat closure mechanism beneath the car seat jacket 200 may inhibit the ability to access the car seat strap closure mechanism.

In such situations, the front closure on the car seat jacket 200 may facilitate rapid opening. An example of one such closure mechanism that permits rapid opening is a hook and loop fastener (VELCRO®).

The car seat jacket may also include at least one weakened region in at least one of the first front panel 212 and the second front panel 214. Such a weakened region may give way in response to a relatively small force placed thereon so as to provide access to the car seat strap closure mechanism.

Figure 12:
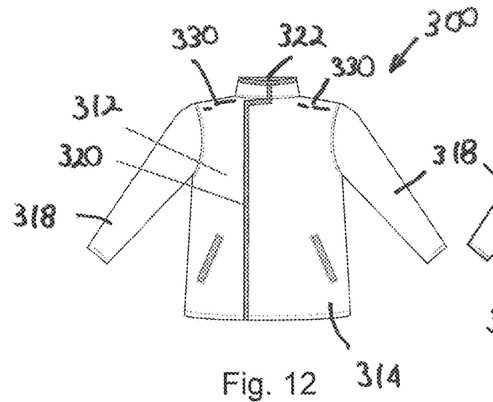
FIG. 12 is a front view of an alternative configuration of the car seat jacket in a closed configuration.
Figure 13:
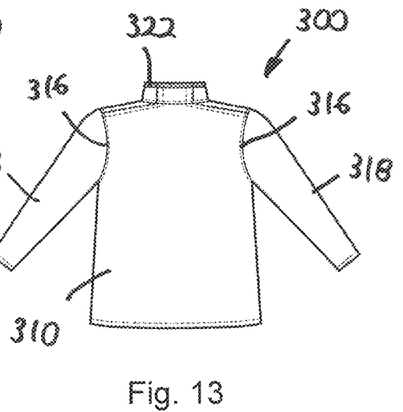
FIG. 13 is a back view of the car seat jacket of FIG. 12 in the closed configuration.
Figure 14:
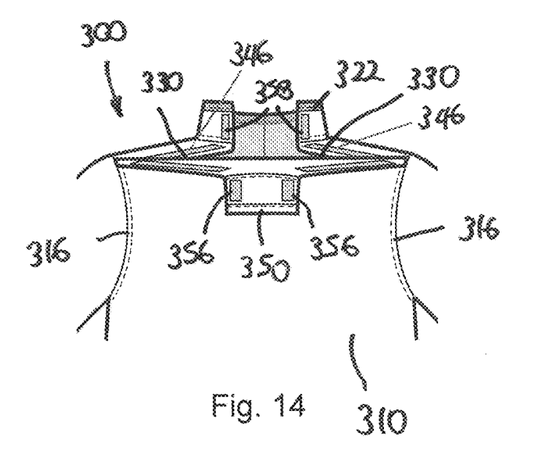
FIG. 14 is a back view of the car seat jacket of FIG. 12 in the open configuration.

Another embodiment of the car seat jacket 300 may generally include a back panel 310, a first front panel 312 and a second front panel 314, such as illustrated in FIGS. 12-14. The first front panel 312 and the second front panel 314 are both secured to the back panel 310.

A person of skill in the art would also appreciate that the car seat jacket 300 having alternative configurations is within the scope of the invention. For example, while it is illustrated that the car seat jacket 300 includes a first front panel 312 that is separate from the second front panel 314, it is possible for the first front panel 312 to be attached to the second front panel 314 such as would be used in a pullover jacket.

The attachment of the first front panel 312 and the second front panel 314 to the back panel 310 may define two arm holes 316 that are positioned proximate an upper edge thereof. The arm holes 316 are adapted to receive the child's arms. In certain embodiments, a sleeve 318 may be attached to the car seat jacket 300 proximate the arm holes 316.

The first front panel 312 and the second front panel 314 may be secured to each other by a fastening mechanism 320. An example of fastening mechanisms 320 that is suitable for use in conjunction with the invention include hook and loop fastener, zipper, buttons and snaps.

In certain embodiments, the hook and loop fastener is available under the designation VELCRO®. On particularly beneficial configuration is VELCRO® model PN90200, which provides good fastening ability while minimizing snagging of a wearer's hair.

When the first front panel 312 and the second front panel 314 are positioned in the closed configuration with the fastening mechanism 320, the car seat jacket 300 has a neck opening 322 proximate an upper end thereof. The neck opening 322 is adapted to receive the child's neck.

The back panel 310, the first front panel 312 and the second front panel 314 may be fabricated from a variety of materials using the concepts of the invention depending on the ambient temperatures at which the car seat jacket 300 is intended to be used. For example, the material may have a relatively high insulating value when the ambient temperature is relatively low.

Proximate an intersection of the back panel 310 and the first front panel 312 and the second front panel 314 on at least one side of the neck opening 322, a slot 330 is formed therein. In certain embodiments the slot 330 is formed on both sides of the neck opening 322 such that the car seat jacket 300 can be used with a car seat having a five point harness.

The length of the slot 330 can be selected based upon a variety of factors. For example, the slot 330 may be formed with a length that is greater than the width of the straps used on the car seat such that contact between the strap and the edges of the slot 330 causes the car seat jacket 300 to stretch or be crumbled. In certain embodiments, the length of the slot 330 may be up to about 2 inches.

The slots 330 may be oriented in a direction that generally conforms to the direction of the car seat strap. In one such configuration, the slots 330 may each be oriented generally horizontal.

Since the car seat strap is typically relatively thin, the slot 330 may be formed with a relatively small width. In certain embodiments, the width of the slot 330 is less than about ½ of an inch. Forming the slot 330 with a relatively small width also minimizes the potential of air flowing through the slot, which could cause the child wearing the car seat jacket 300 to feel cold.

A closure mechanism may be provided to maintain the slot 330 in a closed configuration. The closure mechanism may be configured to allow easy separation to facilitate moving the car seat strap into and out of the slot 330.

The closure mechanism may be particularly beneficial when the car seat jacket 300 is being worn by the child when the child is not in the car seat because the closure mechanism prevents cool air from readily passing into contact with the child's skin.

The closure mechanism may be a detachable fastening device 346 that is provided on opposite sides of the slot 330. The detachable fastening device 346 may have a variety of configurations. Examples of a few suitable configurations include a hook and loop fastener (VELCRO®), magnets or snaps.

The closure mechanism may also include a flap 350 that is positioned intermediate the slots 330. This flap 350 may have a shape that is similar to other portions of the collar on the car seat jacket 300.

The flap 350 is secured to the car seat jacket 300 proximate a first edge thereof. The attachment along the first edge may be permanent such as using stitching so that the flap 350 resists separation from the car seat jacket 300.

A detachable fastening device 356 may be provided on the flap 350 proximate opposite sides thereof. The detachable fastening device 356 is capable of engaging a complementary detachable fastening device 358 proximate the neck opening 322. The detachable fastening devices 356, 358 may have a variety of configurations. Examples of a few suitable configurations include a hook and loop fastener (VELCRO®), magnets or snaps.

The configuration of the flap 350 enables the flap 350 to be moved between a closed configuration (FIGS. 12 and 13) and an open configuration (FIG. 14).

The flap 350 is positioned in the closed configuration when the car seat jacket 300 is used when not in the car seat. The flap 350 thereby increases the warmth provided by the car seat jacket 300.

The flap 350 is positioned in the open configuration when the car seat jacket 300 is used in conjunction with a car seat so that the car seat straps can pass through the slots 330 while the car seat jacket 300 is worn. This process thereby enables the child wearing the car seat jacket 300 to be more securely fastened into the car seat than is possible by positioning the car seat straps over the jacket.

The car seat jacket 300 may be configured differently for use by children having different sizes. For example, the car seat jacket 300 may have a different configuration for use by children weighing less than 30 pounds and children weighing more than 30 pounds.

In certain circumstances such as when the vehicle is in an accident, it may be desirable to quickly remove the child from the car seat. Positioning the car seat closure mechanism beneath the car seat jacket 300 may inhibit the ability to access the car seat strap closure mechanism.

In such situations, the front closure on the car seat jacket 300 may facilitate rapid opening. An example of one such closure mechanism that permits rapid opening is a hook and loop fastener (VELCRO®).

The car seat jacket may also include at least one weakened region in at least one of the first front panel 312 and the second front panel 314. Such a weakened region may give way in response to a relatively small force placed thereon so as to provide access to the car seat strap closure mechanism.

As an initial step in using the car seat jacket 100, the child puts on the car seat jacket 100 but does not fasten the fastening mechanism 120. The child sits in the car seat and puts his/her arms underneath the car seat straps.

The car seat strap is positioned in the slot 130 and the car seat strap closure mechanism is attached to restrain the child in the car seat. The fastening mechanism 120 is then used to position the car seat jacket 100 in the closed configuration.

In another embodiment of the invention, the closure mechanism 140 comprises at least one magnet and a material that may be attracted to the at least one magnet. While these components are not expressly illustrated in the figures, they may have a placement that is similar to the hook and loop fastener that is described above.

A benefit of using the magnet configuration compared to the hook and loop fastening system that is discussed above is that the magnet is less likely to engage a person's hair and/or clothing than the hook and loop fastening system. Such engagement with the person's hair and/or clothing may impede fully closing the clothing article, which could impact the warmth and/or dryness that the clothing article provides to the person wearing the clothing article.

In one configuration of the magnet system, the magnets and/or the material that may be attracted by the magnets are mounted on the clothing article in a spaced-apart configuration similar to the positioning of buttons and button holes on a conventional clothing article.

Alternatively, at least one of the magnets and the material that may be attracted by the magnets extend substantially along an entire length of the portions of the clothing article that are to be held together similar to the manner in which a zipper is typically attached to conventional clothing articles.

Regardless of which of the preceding configurations are used, the attraction between the magnets and the materials that may be attracted by the magnets is sufficiently strong so that the magnet and the material that may be attracted by the magnets to retain the clothing article in the closed configuration.

On the other hand, the attraction between the magnets should not be too strong such that the person cannot readily separate the magnets and the material that is attracted to the magnets when it is desired to disengage the car seat and/or remove the clothing article.

Another advantage of using the magnet closure is that at least one of the magnets and the material that is attracted to the magnets may be placed inside of the clothing article such as between two pieces of fabric during the manufacturing process.

This configuration reduces the potential of the magnet and the material that is attracted to the magnets to be removed such as by a child who is wearing the clothing article. This configuration also reduces the potential of inadvertent separation of the magnet and the material that is attracted to the magnet during the use of the clothing article.

A variety of different types of magnets may be used in conjunction with the concepts of the invention. Many types of magnets have sufficient magnetic field strength to retain the clothing article in the closed configuration. The magnets may be made sufficiently flexible to minimize interference with the person putting on or removing the clothing article.

In certain embodiments, the magnets are permanent magnets that continuously emit a magnetic field. In other embodiments, the magnets are electro magnets. The electro magnets may be attached to a switch in the clothing article.

Alternatively or additionally, the electro magnets may be activated and/or deactivated by the car seat and/or the vehicle in which the invention is being used. For example, the electro magnets may deactivate when the vehicle is turned off to facilitate the person wearing the clothing article getting out of the car seat. Alternatively or additionally, the electro magnets may turn off when an accident has been detected such as by deployment of the air bags in the vehicle.

The material that is attracted to the magnet may have a variety of configurations. In one such configuration, the material is a magnet that is oriented so that it is attracted to the other magnets. In another configuration, the material is a metallic material that may be attracted to the magnets.

In certain instances, the magnet slides with respect to the material that is attracted to the magnet to open the clothing article. In other instances, the magnet may be peeled away from the material that is attracted to the magnet to open the clothing article.

The invention may also include a lip that extends from at least one of the magnet and the material that is attracted to the magnet. The lip may have a relatively short height. The lip may reduce the potential of the magnet and the material that is attracted to the magnet inadvertently sliding with respect to each other such as when the person wearing the clothing article moves.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of facilitating securing a child in a car seat, wherein the method comprises:
   providing a jacket body comprising a front panel, a back panel and a neck opening, wherein the front panel and the back panel are attached together;
   forming at least one slot in the jacket body proximate the neck opening;
   operably attaching a closure flap to the jacket body proximate the neck opening and the intersection of the front panel and the back panel;
   positioning the closure flap in a closed configuration where the closure flap substantially covers the at least one slot;
   moving the closure flap to an open configuration where the closure flap does not substantially cover the at least one slot;
   positioning a child in the car seat, wherein the car seat comprises a strap and a lock mechanism;
   extending the car seat strap though the at least one slot; and
   engaging the car seat strap and the car seat lock mechanism to retain the child in the car seat.

2. The method of claim 1, and further comprising retaining the closure flap in the closed configuration with a detachable fastening device.

3. A method of facilitating securing a child in a car seat, wherein the method comprises:
   providing a jacket body having a neck opening;
   forming at least one slot in the jacket body proximate the neck opening, wherein the at least one slot is capable of receiving a strap that is attached to the car seat;
   providing a closure flap having a border, wherein the border has color that contrasts from a color of an outer surface of the closure flap and an outer surface of the jacket body and wherein the border extends around at least a portion of an edge of the closure flap that is not attached to the jacket body;
   operably attaching the closure flap to the jacket body; and
   positioning the closure flap in a closed configuration to substantially cover the at least one slot.

4. The method of claim 1, wherein the at least one slot comprises a first slot and a second slot that are on opposite sides of the neck opening.

5. The method of claim 4, wherein the jacket body comprises a collar, wherein the closure flap comprises a first flap and a second flap and a third flap and wherein the method further comprises:
   substantially covering the first slot with the first flap;
   substantially covering the second slot with the second flap; and
   engaging opposite ends of the collar with the third flap that is between the first flap and the second flap, wherein when the third flap engages opposite ends of the collar so that the collar and the third flap extend substantially around the neck opening.

6. The method of claim 1, wherein the at least one slot intersects the neck opening.

7. The method of claim 1, wherein the front panel comprises a first front panel and a second front panel that are both attached to the back panel and wherein a fastening mechanism is provided to detachably secure the first front panel to the second front panel.

8. The method of claim 1, wherein the attachment of the front panel and the back panel defines at least one arm hole and wherein the car seat jacket further comprises a jacket arm attached to the car seat jacket proximate the at least one arm hole.

* * * * *